UNITED STATES PATENT OFFICE.

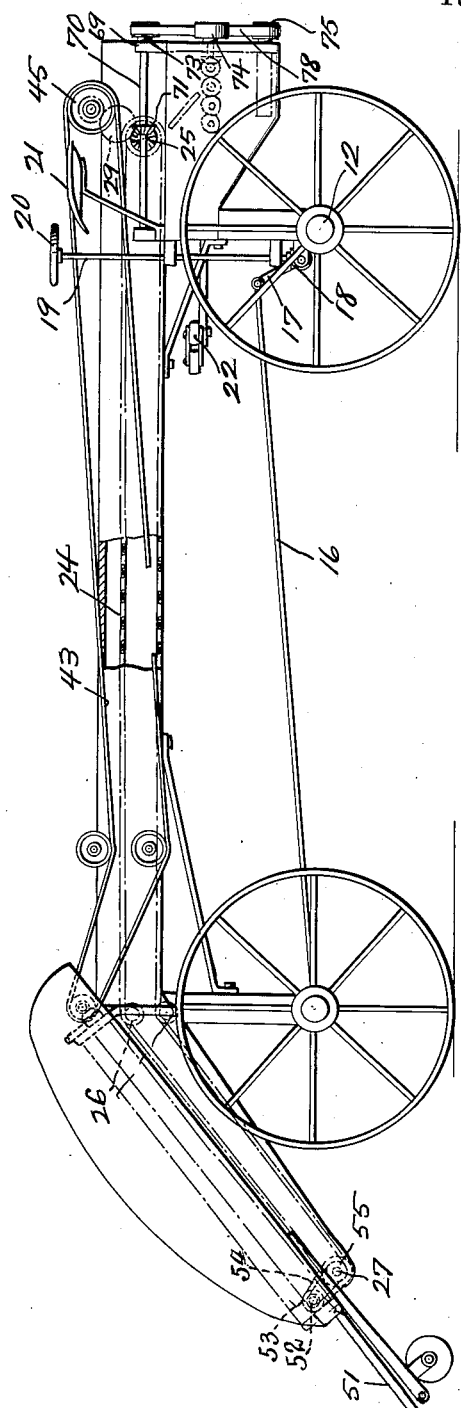

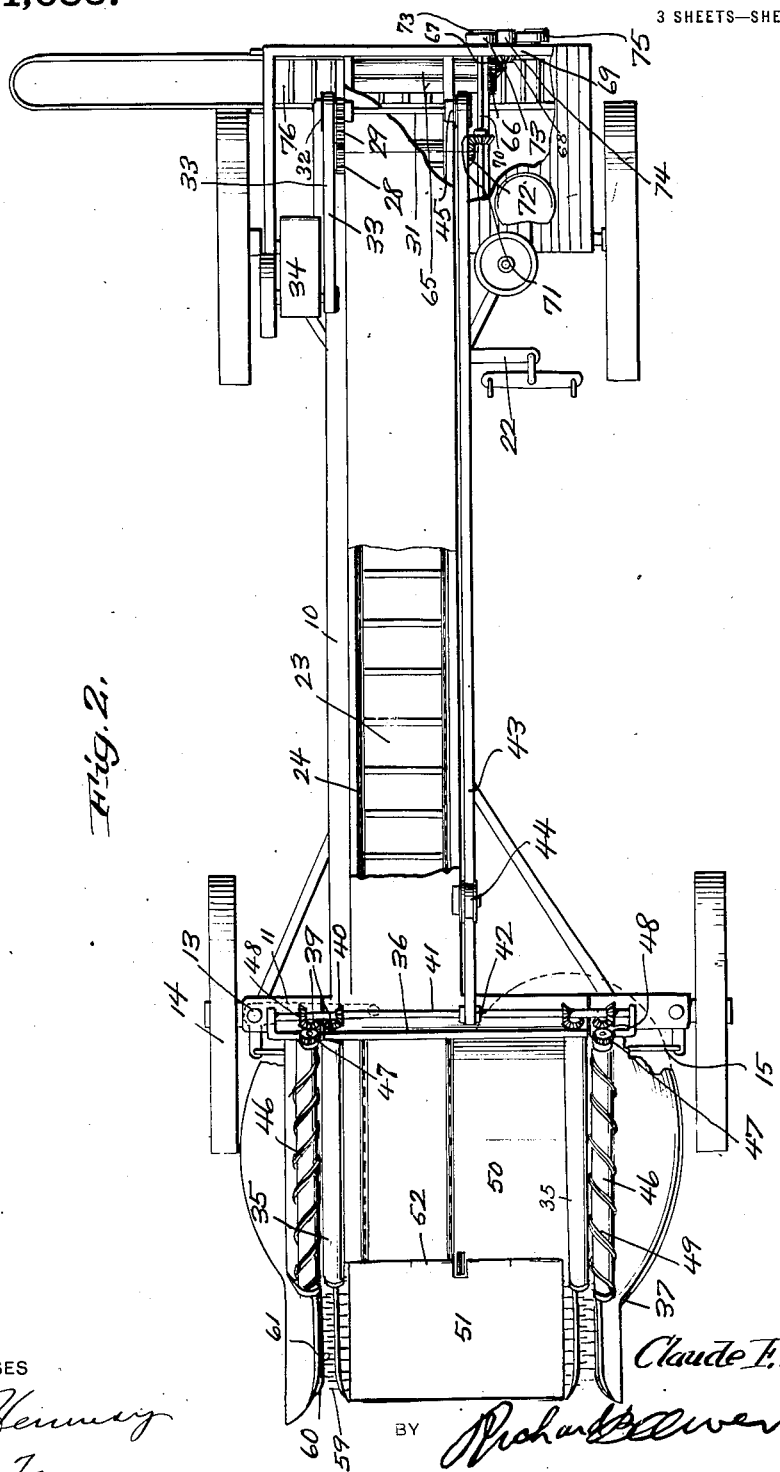

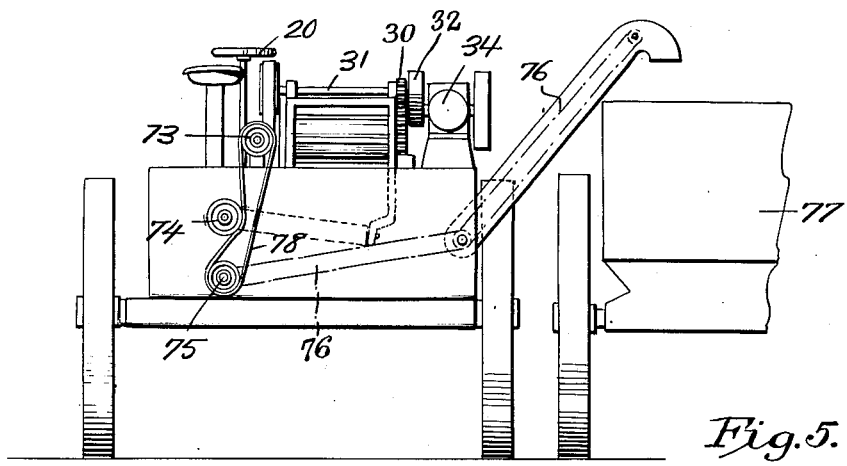
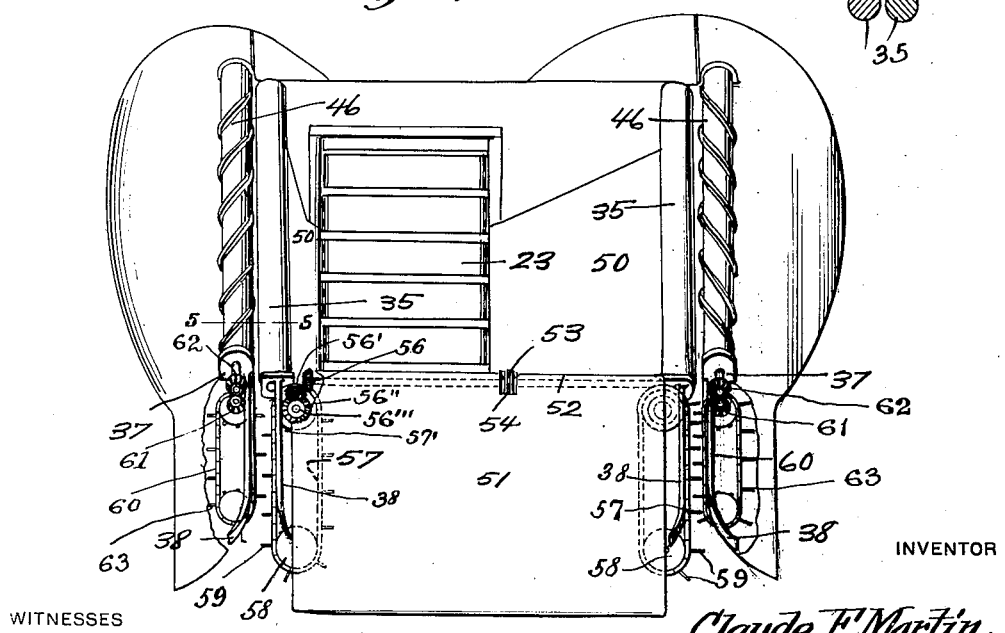

CLAUDE F. MARTIN, OF PAXTON, ILLINOIS, ASSIGNOR OF ONE-HALF TO CARL RODEEN, OF PAXTON, ILLINOIS.

CORN-HARVESTER.

1,324,683.   Specification of Letters Patent.   Patented Dec. 9, 1919.

Application filed February 8, 1918. Serial No. 216,045.

*To all whom it may concern:*

Be it known that I, CLAUDE F. MARTIN, a citizen of the United States, residing at Paxton, in the county of Ford and State of Illinois, have invented certain new and useful Improvements in Corn-Harvesters, of which the following is a specification.

This invention has relation to corn harvesting machines, and has for an object to provide a machine embodying means for stripping the ears from the stalks, for conveying the ears to the rear portion of the machine, for husking the ears and for elevating the ears into a wagon or receptacle.

Another object of the invention is to provide a novel type of stripping mechanism for corn harvesting machines, including means for raising the fallen stalks.

Another object of the invention is to provide a corn-harvesting machine embodying the elements and having the characteristics above set forth, adapted to be drawn over the field by a tractor, animal power or the like, and embodying a prime mover such as an internal combustion engine for operating the various elements.

In addition to the foregoing my invention comprehends improvements in the details of construction, and arrangement of the parts to be hereinafter more fully described and particularly set forth in the appended claims.

In the accompanying drawings in which similar and corresponding parts are designated by the same characters of reference throughout the several views in which they appear;

Figure 1, is a view in side elevation of a corn harvester constructed in accordance with my invention.

Fig. 2, is a view thereof in top plan, with parts broken away.

Fig. 3, is a view of the machine in rear elevation,

Fig. 4, is a view thereof in front elevation, and

Fig. 5 is a section through the stripping rollers taken on the line 5—5 of Fig. 4.

With reference to the drawings 10 indicates a wagon body in the nature of a trough to contain an endless conveyer, said wagon body being mounted at its ends upon forward and rear axles 11 and 12 respectively. The forward axle is provided at each end with a steering knuckle 13 to support the forward supporting wheels 14, said steering knuckles being connected for movement in unison by means of a connecting bar 15. One of the knuckles is actuated by means of a longitudinally extending rod 16 which extends rearwardly and is pivotally connected to an arm 17 mounted for oscillation and having a bevel gear which is in mesh with a bevel gear 18 mounted upon the lower end of a vertical steering column 19 provided with an operating wheel 20 located adjacent the driver's seat 21. The machine may thus be steered, and may be drawn over the field by animals hitched to the whiffletree 22, or by means of a tractor.

An endless conveyer 23 is mounted within the wagon body 10 for horizontal movement, operating through the medium of chains 24 of which one is provided adjacent each edge of the conveyer. The rear end of the conveyer travels around sprockets mounted upon a shaft 25, while the forward end of the conveyer is trained over idler wheels 26 in order to incline the forward end of the conveyer downwardly to a point adjacent the surface of the ground, the forward end of the conveyer traveling over sprockets mounted upon a shaft 27. The shaft 25 at the rear end of the conveyer is provided with a spur gear 28 which meshes with an idler spur gear 29 the same being in meshing engagement with an operating pinion 30 mounted upon a shaft 31 parallel to the said shaft 25 and located thereabove, said shaft 31 carrying a belt pulley 32, around which an endless belt 33 passes the same being driven by an internal combustion engine indicated at 34 and mounted upon the body of the wagon. The conveyer is thus driven directly by the prime mover so as to move the upper stretch of the conveyer rearwardly.

Mounted at each side of the forward and downwardly inclined portions of the conveyer are a pair of longitudinally extending, downwardly inclined parallel rollers 35 which are journaled at their upper ends in a transversely extending frame bar 36 mounted upon the forward axle 11, their lower ends being journaled in brackets 37 which are provided with forwardly extending guide members 38 in spaced relation, the forward terminals of said guide members 38 being in diverging relation so as to gather the stalks and direct them into the space between the rollers 35. Each roller 35 is provided at its upper end with a bevel gear 39, each being in meshing engagement with a bevel gear 40, of which there are four provided, the same being mounted upon a transversely extending shaft 41 journaled at its ends in the frame bar 36, the intermediate portion of said shaft 41 carrying a belt pulley 42. An endless belt 43 passes around said pulley, and beneath idlers 44 mounted on the side of the conveyer body 10, the rear end of the belt traveling around a pulley 45 which is mounted upon the above mentioned shaft 31.

Mounted in superposed relation and in parallelism to one roller of each pair of rollers 35 is a stripping roller 46 journaled at their upper ends in the frame bar 36 and having pinions 47 secured thereto for meshing engagement with pinions 48 mounted upon the roller 35 directly therebeneath whereby the stripping roller 46 may be driven by its coacting roller 35. Each stripping roller 46 is provided with a spiral rib 49 extending from end to end. A pair of guides 50 are provided, having their outer edges located adjacent the rollers 35 and their opposite edges adjacent the downwardly inclined forward portion of the conveyer whereby to receive the ears from said rollers 35 to direct them into the conveyer.

A platform 51 is mounted forwardly of said downwardly inclined portion of the conveyer, for vertical oscillatory movement upon a shaft 52. Said shaft carries a sprocket wheel 53 around which a chain 54 passes, said chain also passing around a sprocket 55 mounted upon the shaft 27 at the forward end of the conveyer. A beveled gear 56 is provided on each end of the sprocket 52 and meshes with a double faced beveled gear 56' which in turn meshing with beveled gear 56'' carried on the upper end of a vertical shaft 56'''. A sprocket wheel 57' is carried on the lower end of the vertical shaft 56'''. An idler sprocket 58 is mounted upon the lower end of the platform 51 and a sprocket chain 57 passes around the sprocket wheels 57' and 58. Each chain 57 is moreover provided with spurs or teeth 59. Movable in contiguous relation to each chain 57 is an endless chain 60 passing around sprocket wheels which are mounted in the brackets 37 mentioned above, the upper sprockets having a bevel gear 61 rotatable therewith for meshing engagement with a bevel gear 62 mounted upon the roller end of one pulley 35 of each pair. The chains 60 are likewise provided with teeth 63 for coaction with the teeth 59 to elevate the stalks of corn which have fallen to the ground, and to direct the same between the guides 38. The forward end of the platform 51 is mounted upon a wheel 64 which maintains the forward end of the platform in closely spaced relation to the ground.

Mounted beneath the rear end of the conveyer 23 is a husking mechanism including a pair of transversely extending closely spaced rollers 65 each having a spur gear 66 at one end for meshing engagement to insure rotation of the rollers in unison, one roller having a bevel gear 67 for meshing engagement with a bevel gear 68 mounted upon a shaft which is journaled in a frame 69 carried by the rear axle. A shaft 70 is mounted above the said shaft which carries a bevel gear 68 and extends to a point adjacent the shaft 25 at the rear end of the conveyer. Said shaft 70 is provided with a bevel gear 71 which meshes with the bevel gear 72 mounted on said shaft 25 of the conveyer whereby the shaft 70 may be driven. The rear end of the shaft 70 carries a pulley 73, and the shaft which carries the bevel gear 68 is provided with a pulley 74. A pulley 75 is then mounted beneath the pulley 74 and is designed to actuate a transversely extending endless conveyer 76 which is inclined upwardly to deposit the ears in a wagon 77 which is drawn along the right hand side of the harvester. An endless belt 78 is passed around the pulleys 73 and 75, and one stretch engages the pulley 74 so as to rotate the same.

In operation, the harvester is drawn over the field in the manner mentioned above, and the motion of the prime mover 34 is transmitted to the endless conveyer in the manner described above so as to move the upper stretches thereof rearwardly. Motion of the prime mover is also transmitted through the shaft 31 and belt 43 to the transverse shaft 41 mounted directly above the front axle 11. Motion of said shaft 41 is then transmitted through the bevel gears 40 to the bevel gears 39 of the rollers 35 thereby rotating them in opposite directions. The chains 57 and 60 at the edges of the platform 51 are actuated respectively by power received from the shaft 27 at the forward end of the conveyer, and from one of the rollers 35 of each pair, whereby to lift the fallen corn and direct the stalks into the guides 38 whereby the stalks are subsequently engaged by the rollers 35 and moved to vertical position. The stripping rollers 46 are geared for rotation in a direction opposite the direction of rotation of its coacting roller 35 whereby the ears are stripped from the stalks and permitted to fall upon the guides from whence they are directed into the downwardly inclined portion of the conveyer 23 and carried thereby rearwardly. The ears then fall from the rear end of the conveyer upon the husking roller 65 and after the husks are removed therefrom the ears fall upon the conveyer 76 for conveyance into the wagon.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. In a corn harvester, a wheel supported frame, an endless conveyer mounted therein and having one end directed downwardly and forwardly, a vertically adjustable platform pivotally mounted adjacent the lower end of the conveyer, stripping rollers rotatably mounted on the frame and operable on each side of the platform, and means for operating the conveyer and stripping rollers.

2. In a corn harvester, a wheel supported frame, an endless conveyer mounted therein and having one end directed downwardly and forwardly, a vertically adjustable platform pivotally mounted adjacent the lower end of the conveyer, a wheel secured to the under side of the platform, stripping rollers rotatably mounted on the frame and operable on each side of the platform, and means for operating the conveyer and stripping rollers.

3. In a corn harvester, a wheel supported frame, an endless conveyer mounted therein and having one end directed downwardly and forwardly, a vertically adjustable platform pivotally mounted adjacent the lower end of the conveyer, a wheel secured to the under side of the platform, stripping rollers rotatably mounted on the frame and operable on each side of the platform, means for operating the conveyer and stripping rollers, husking rollers mounted below the opposite end of the conveyer, and means for operating said husking rollers.

4. In a corn harvester, a wheel supported frame, an endless conveyer mounted therein having one end directed downwardly and forwardly, a pair of stripping rollers at each side of said inclined portion of the conveyer, a third stripping roller mounted above one roller of each pair, a spiral rib formed on said last mentioned stripping roller, means for driving said conveyer and said rollers, a pair of diverging guides adjacent the lower ends of each pair of rollers, a vertically movable platform pivotally mounted adjacent the lower end of the conveyer, and a pair of contiguously movable chains at opposite edges of said platform to direct corn into the guides.

In testimony whereof I affix my signature in presence of two witnesses.

CLAUDE F. MARTIN.

Witnesses:
 C. S. SCHNEIDER,
 HAIDEE SMITH.